United States Patent [19]

Kralicek et al.

[11] 4,048,421

[45] Sept. 13, 1977

[54] METHOD OF ANIONING POLYMERIZATION OF UNSATURATED MONOMERS

[75] Inventors: Jaroslav Kralicek, Prague; Vladimir Kubanek, Kralupy; Jaroslava Kondelikova; Bohuslav Casensky, both of Prague; Jiri Machacek, Roztoky, all of Czechoslovakia

[73] Assignee: Vysoka skola chemicko technologicka, Prague, Czechoslovakia

[21] Appl. No.: 516,820

[22] Filed: Oct. 21, 1974

[51] Int. Cl.$^2$ .................. C08F 112/08; C08F 120/44; C08F 212/08
[52] U.S. Cl. .................................. 526/177; 526/209; 526/226; 526/324; 526/341; 526/346; 526/347

[58] Field of Search ............... 260/93.5 R; 450/683.5; 526/177, 346, 347, 341, 209, 324, 226

[56]  References Cited

U.S. PATENT DOCUMENTS 2,870,101   1/1959   Stewart .............................. 526/226

FOREIGN PATENT DOCUMENTS 920,559   3/1963   United Kingdom ............. 450/683.5

Primary Examiner—William F. Hamrock

[57]  ABSTRACT

A method for the anionic polymerization of unsaturated monomers involves effecting reaction in the presence of an organic derivative of a metal alumina hydride in an amount ranging from 0.01 to 5.0 mol percent based upon the amount of unsaturated monomer.

12 Claims, No Drawings

METHOD OF ANIONING POLYMERIZATION OF UNSATURATED MONOMERS

This invention relates to a technique for the anionic polymerization of unsaturated monomers. More particularly, the present invention relates to a technique for the polymerization of unsaturated monomers in the presence of an organic derivative of an alkali metal alumina hydride.

It has long been recognized that a majority of the monomeric compositions comprising carbon to carbon double bonds can be readily polymerized in the presence of free radical initiators or compositions known to initiate cationic, anionic or coordination polymerization reactions. In recent years, the anionic polymerization technique has gained increasing popularity due to its widespread applicability. Thus, for example, the anionic technique which may be classified as involving a nucleophidic addition reaction, may always be used for the polymerization of monomers wherein the carbon-carbon double bond or atoms vicinal thereto are substituted with $-CN$, $-NO_2$, $-COOR$ (R being an alkyl group having from 1-6 carbon atoms), $-CH=CH_2$, aryl or similar groups which facilitate the nucleophidic addition.

Heretofore, it has been conventional to utilize a wide variety of catalysts in the anionic polymerization of unsaturated compounds, the most popular materials for such purposes being the metals of group I(a) or II(a) of the Mendeleef Periodic Table of the Elements or the hydroxides or alcoholates thereof. Additionally, workers in the art have suggested the use of metallo-organic compounds of the foregoing metals as well as metallo-organic compounds or alcoholates of the electropositive metals of group III of the Mendeleef Periodic Table. Unfortunately, the catalyst employed heretofore for such anionic polymerization processes suffer from certain inherent limitations, as for example, limited solubility in the monomer, particularly in those cases wherein a weak polar monomer or solvent is employed. Additionally, the pryophoric nature of certain of the abovementioned materials, particularly the alkali metals and certain metallo-organic compounds necessitates extensive safety measures and the generation of an ambient evidencing limited oxygen content and a low relative humidity. Lastly, the removal of such catalysts from the polymerization system is, standing alone, a hazardous operation requiring extensive industrial ingenuity with the concomitant increase in the economics of operation. A further limitation of the metallo-organic compounds resides in their limited stability, so requiring their preparation immediately prior to the polymerization process and/or storage at temperatures less than the ambient temperature. This is particularly true in the case of metalloalkyl compounds and the alkali metal aromatic hydrocarbons.

In accordance with the present invention, these prior art limitations have been effectively obviated by the use of anionic polymerization catalysts comprising organic derivatives of metallic alumino hydrides. Briefly, the inventive technique involves anionic polymerization of an unsaturated monomer of the general formula $$CH_2 = CXY$$

wherein X and Y are selected from among aryl, vinyl, hydrogen, $-CN$, $-NO_2$, COOR (R being an alkyl group having from 1 to 6 carbon atoms) or Cl substituents, such polymerization being conducted in the presence of an organic derivative of a metal alumina hydride having the general formula $$Me\,[AlH_x(OR')_{4-x}]_n$$

wherein Me is a metal selected from among the metals in group I(a) and II(a) of the Mendeleef Periodic Table, $x$ is an integer ranging from 1-2 and R' is either $-CH_2CH_2OR''$ or $-CH_2CH_2N(R'')_2$ wherein R'' is an alkyl group having from 1-4 carbon atoms.

The alumina hydrides suitable for use in the practice of the present invention are soluble to some extent in each of the noted monomeric compositions and, if desired, the solubility thereof may be adjusted by modification of the R' substituent. Many of the compositions falling within the noted empirical formulation are of recent origin and may be prepared in accordance with the procedure set forth in Czechoslovakian Patent Specification No. 132,638, 134,720 or 138,484.

Studies have revealed that the described catalysts are not pyrophoric in nature and decompose spontaneously without self-ignition when hydrolized. Additionally, they are capable of readily bonding with trace quantities of water present in monomeric mixtures, thereby enhancing the polymerization process which is normally sensitive to the presence of moisture. Accordingly, the inventive technique herein described permits greater reproducibility of the polymerization process than attained in accordance with the prior art techniques. Furthermore, the described alumina hydrides are prepared and marketed in the form of either benzene or toluene solutions; they may conveniently and safely be incorporated in the polymerization system.

In the practice of the invention, it has been determined that very limited amounts of catalyst are required to effectively initiate the anionic polymerization process, a general preference existing for the use of from 0.01 - 5 mol percent of catalyst based upon the weight of unsaturated monomer employed.

Although a wide variety of catalysts have been utilized herein, a general preference has been established for sodium tri-2 methoxyethoxy alumina hydride $[NaAlH(OCH_2CH_2OCH_3)_3]$ and sodium di-2 methoxyethoxy alumina hydride $[NaAlH_2(OCH_2CH_2OCH_3)_2]$.

Examples of the application of the present invention are set forth below. These examples are intended merely as illustrations and it is to be appreciated that variations therefrom may be made by one skilled in the art without departing from the spirit and scope of the invention.

EXAMPLE I

An unsaturated monomer comprising 1 mole of anhydrous distilled styrene, previously freed from stabilizer, was selected for anionic polymerization. 0.01 mole of sodium di-2 methoxyethoxy alumina hydride, $[NaAlH_2(OCH_2CH_2OCH_3)_2]$, in the form of a 75 percent solution in benzene was added to the monomer at ambient temperature. Following, the reaction mixture was homogenized by agitation, the temperature thereof rising to 90° C due to the nature of the exothermic polymerization reaction. After 15 minutes, a solid red product was obtained, said product evidencing a viscosity limit of 0.23 dl/g and a molecular weight distribution range, $M_w:M_n$ of 3.1.

For comparative purposes, the above-described procedure was repeated using a sodium tetraphenylboride catalyst. The resultant polymer evidenced a substantially monomer molecular weight distribution range, $M_w:M_n = 1.08$.

EXAMPLE II 0.01 mole of sodium tri-2 methoxydimethylamine alumina hydride, $NaAlH[OCH_2CH_2N—(CH_3)_2]$ in crystalline form was added to a solution containing 1 mole of anhydrous styrene in 200 ml. of n-hexane. The reaction mixture was agitated for a period of 5 minutes. After the expiration of 2 hours, a viscous reddish polymer solution containing 0.6 percent free styrene was obtained. To this solution there was added 0.5 mole of additional styrene and agitation effected while slowly heating the mixture to a temperature of 50° C, so resulting in a homogenized solution. After the expiration of 2 hours, a viscous reddish polymer solution again containing 0.6 percent free styrene was obtained.

For comparative purposes, an analogous polymerization of 1 mole of styrene in 200 ml. of n-hexane was conducted in the presence of a suspension of amylsodium (0.2 mole) in n-hexane. After 6 hours of polymerization at 20° C below zero, only 26.7 percent of polystyrene was recovered.

EXAMPLE III 4 mole percent of sodium di-2 ethoxymethoxy- alumina hydride, $NaAlH_2(OCH_2CH_2OCH_3)_2$, in solution with toluene were added to 150 ml of a cooled toluene solution (20° C) containing 0.5 mole of styrene and 0.5 mole of butadiene 1, 3. The reaction mixture was agitated for 1 hour at room temperature in an autoclave and the resultant polymerized product precipitated with an excess of methanol. The yield was approximately 43%, the butadiene comprising 28% of the copolymer.

EXAMPLE IV 0.001 mole of $NaAlH_2(OCH_2CH_2OCH_3)_2$ dissolved in 100 ml of toluene was added to 0.5 mole of freshly-distilled acrylonitrile dissolved in 100 ml of anhydrous dimethylformamide, additions being effected at 50° C below zero. The reaction mixture was heated by means of heat generated in the exothermic polymerization reaction and, after 60 minutes, a slightly yellowish polyacrylonitrile was obtained. Following, the polymer was extracted with acetic acid, precipitated with water, filtered and dried, so yielding a quantitative polyacrylonitrile.

For comparative purposes, the procedure was repeated using lithium aluminum hydride ($LiAlH_4$) as the polymerization catalyst. During a comparable time period, polymerization of the acrylonitrile was not observed.

EXAMPLE V 0.1 mole of $LiAlH(OCH_2CH_2)C_2H_5)_3$ in a 2 percent toluene solution was added with agitation, in an inert nitrogen atmosphere, to 50 grams of acrylonitrile dissolved in 100 ml of anhydrous toluene. During the resultant polymerization process, there was produced a pulverulent slightly yellowish polymer in a quantitative yield, expressed in degree of polymerization, of $1.2 \times 10^3$.

For comparative purposes the procedure was repeated in the presence of a lithium aluminum hydride catalyst. Polymerization was found to proceed at a negligible rate.

EXAMPLE VI 50 grams of a styrene-acrylonitrile mixture (1:1 ratio) were added dropwise over a period of 1 hour at 20° C to a solution of 0.1 gram of $NaAlH_2[OCH_2CH_2OCH(CH_3)_2]_2$ in 100 grams of tetrahydrofuran. The resultant copolymer (98 percent yield) was pulverulent and evidenced a molecular weight of 130,000.

For comparative purposes, the procedure was repeated using a $LiAlH_4$ catalyst. The yield of copolymer was found to be of the order of several percent.

EXAMPLE VII $1 \times 10^{-4}$ mole of a 70 percent $NaAlH_2(OCH_2CH_2OCH_3)_2$ solution in benzene was added to a mixture comprising 0.1 mole of styrene and 0.1 mole of the glycidyl ester of methacrylic acid, the reaction mixture being heated at 50° C in an inert dry nitrogen atmosphere. After 15 minutes, the viscosity of the solution began to rise and after 30 minutes the temperature rose to 100° C. Heating was terminated after 45 minutes. The resultant product was a translucent slightly yellowish polymer which indicated a conversion of 80 percent, the quantity of oxirane cycles, after extraction, being less than 40 mol percent.

Analysis of the foregoing results reveals that the described process, in contradistinction to known processes, is efficacious because of the formation of a homogeneous phase which yields a polymer having a relatively narrow range of molecular weight. Further, the degree of polymerization can be controlled by the nature of the substituents on the alumina hydrate and, the velocity of polymerization can be regulated by the hydrate employed, solvent and temperature of reaction. Unlike many of the conventional anionic polymerization processes catalyzed by soluble catalysts, the products obtained in accordance with the described process are characterized by a broader molecular weight distribution range which is advantageous for further processing.

What is claimed is:

1. Method for the anionic polymerization of an unsaturated monomer of the general formula $$CH_2 = CXY$$

wherein X and Y are selected from the group consisting of hydrogen, aryl, vinyl, —CN, —$NO_2$, COOR and Cl, R being an alkyl group having from 1-6 carbon atoms which comprises adding to said monomer an organic derivative of a metal alumino hydride having the general formula $$MeAlH_x(OR')_{4-x}$$

wherein Me is a metal selected from the group consisting of the group I(a) and II(a) metals of the Mendeleef Periodic Table, $x$ is an integer ranging from 1-2, R' is selected from the group consisting of (a) $CH_2CH_2OR''$ and (b) $CH_2CH_2N(R'')_2$ wherein R'' is an alkyl group having from 1-4 carbon atoms.

2. Method in accordance with claim 1 wherein said alumina hydride is present in an amount ranging from 0.01 to 5.0 mol percent based upon the weight of unsaturated monomer.

3. Method in accordance with claim 1 wherein said hydride is $NaAlH(OCH_2CH_2OCH_3)_3$.

4. Method in accordance with claim 1 wherein said hydride is $NaAlH_2(OCH_2CH_2OCH_3)_2$.

5. Method in accordance with claim 1 wherein said hydride is $NaAlH[OCH_2CH_2N(CH_3)_2]_3$.

6. Method in accordance with claim 1 wherein said hydride is $LiAlH(OCH_2CH_2OC_2H_5)_3$.

7. Method in accordance with claim 1 wherein said hydride is $NaAlH_2[OCH_2CH_2OCH(CH_3)_2]_2$.

8. Method in accordance with claim 4 wherein said monomer is styrene.

9. Method in accordance with claim 4 wherein said monomer is acrylonitrile.

10. Method in accordance with claim 4 wherein said monomer comprises a mixture of styrene and acrylonitrile.

11. Method in accordance with claim 4 wherein said monomer comprises a mixture of styrene and the glycidyl ester of methacrylic acid.

12. Method for the anionic polymerization of styrene which comprises adding thereto an organic derivative of a metallo aluminum hydride of the formula $$MeAlH_x[OCH_2CH_2O(CH_2)_yH]_{4-x}$$

wherein Me is a metal selected from the group consisting of the Group I(a) and II(a) metals of the Mendeleef Periodic Table, $x$ is an integer from 1–2 and $y$ is an integer from 1–4.

* * * * *